United States Patent [19]

Messner

[11] Patent Number: 4,624,781

[45] Date of Patent: Nov. 25, 1986

[54] AIR DIFFUSION DEVICE FOR AERATING WATER WITH SMALL BUBBLES

[76] Inventor: Rudolf Messner, Laufer Mühle, D-8551 Adelsdorf, Fed. Rep. of Germany

[21] Appl. No.: 764,587

[22] Filed: Aug. 12, 1985

[30] Foreign Application Priority Data

Aug. 16, 1984 [EP] European Pat. Off. ........ 84109756.1

[51] Int. Cl.$^4$ ............................. C02F 7/00; C02F 3/20
[52] U.S. Cl. ................................. 210/220; 210/221.2; 261/122; 239/145
[58] Field of Search ............................ 210/220, 221.2; 261/122, 124, DIG. 88; 4/542, 543; 239/145

[56] References Cited

U.S. PATENT DOCUMENTS

| | | | |
|---|---|---|---|
| 1,343,123 | 6/1920 | Gahl et al. ............................ | 261/122 |
| 1,642,051 | 9/1927 | Wall ........................................ | 4/542 |
| 2,040,941 | 5/1936 | Jones et al. ........................... | 210/220 |
| 2,687,287 | 8/1954 | Coppock ............................... | 261/124 |
| 3,111,686 | 11/1963 | Sierant ................................. | 261/124 |
| 3,182,978 | 5/1965 | Reilly .................................... | 210/220 |
| 3,490,752 | 1/1970 | Danjes et al. ........................ | 261/122 |

FOREIGN PATENT DOCUMENTS

| | | | |
|---|---|---|---|
| 2942607 | 4/1981 | Fed. Rep. of Germany ...... | 261/122 |
| 396732 | 8/1933 | United Kingdom ................ | 261/122 |

*Primary Examiner*—Benoit Castel
*Attorney, Agent, or Firm*—Browdy and Neimark

[57] ABSTRACT

An air diffusion device for aerating water with small bubbles, such as for use in clarification ponds, has a perforated air diffusion foil mounted above a tight backing plate. Cross strips are fixed above the foil. The foil is joined tightly at its edges to the solid plate by means of edge strips; cross strips are joined directly to the backing plate. Ballast inlays, preferably extending crosswise, are mounted at intervals in the solid plate to increase the weight of the device.

11 Claims, 2 Drawing Figures

AIR DIFFUSION DEVICE FOR AERATING WATER WITH SMALL BUBBLES

The invention relates to an air diffusion device for aerating water with small bubbles, in particular for use in biological sewage treatment plants, having a perforated air diffusion foil disposed over a tight backing. This foil is fastened with its edges, and if no air or little air is supplied it rests smoothly on the tight backing. The foil is joined in an airtight manner to the backing, and the cross strips disposed above the perforated air diffusion foil.

BACKGROUND OF THE INVENTION

An air diffusion device of this type is known from German Patent DE-PS No. 29 42 607. In the known air diffusion device, the perforated air diffusion foil is joined to a tight backing by means of a closed frame. The tight backing comprises an unperforated foil, which is supported by a plurality of cross strips extending between the sides of the frame. Since the air diffusion device of the type described must be continuously under water during operation, the closed frame and the cross pieces extending between the sides of the frame must be made of nonrusting material. Manufacturing the closed frame and fastening the unperforated and perforated foils is very costly.

SUMMARY OF THE INVENTION

It is accordingly the object of the present invention to embody an air diffusion device of the above-described type in such a way that its manufacture and assembly become easier and simpler, while economizing in terms of the use of expensive materials.

In the present invention this object is obtained by using a tight backing comprising a solid plate made of plastic, that the perforated air diffusion foil is joined tightly to the plate at its edges by means of edge strips, and that the cross strips are likewise of plastic and are joined directly to the solid plate.

The joining of the edge strips, the perforated air diffusion foil and/or the cross strips to the solid plate can advantageously be effected by means of screws, preferably of the self-tapping type, but may also be done by riveting.

According to a further exemplary embodiment, brackets gripping the frame at intervals are provided for joining the edge strips and the solid plate.

To prevent the air diffusion device from floating upward, a further embodiment of the invention provides ballast inlays that are disposed in the solid plate, preferably in the form of crosswise extending strips, made for instance of iron or steel.

In still another embodiment of the invention, the perforated air diffusion foil is provided with an air supply connection in a sealing disk.

The solid plate may be made of plastic materials, preferably glass-fiber-reinforced plastic, Eternit [trade name for asbestos cement] or the like. The cross strips are also of plastic. In manufacturing these parts from plastic, the one advantage is in the connection of these parts, without making pre-drilled holes, by using self-tapping screws or rivets.

Since in accordance with the present invention the cross strips disposed above the perforated air diffusion foil are screwed or riveted to the solid plate, longitudinal chambers are formed in the air diffusion device, which cause a further improvement and uniformity in the aeration.

BRIEF DESCRIPTION OF DRAWING

Further characteristics and advantages of the invention will be described in detail, referring to the following drawing, which shows schematic exemplary embodiments.

Figure 1:
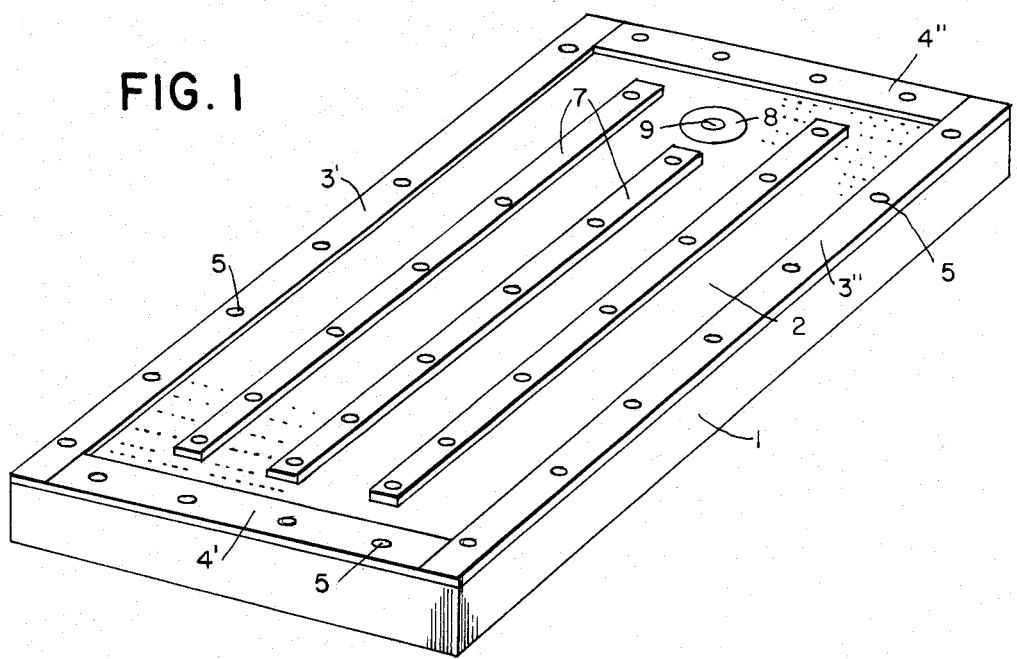
FIG. 1, is an air diffusion device in a perspective view.

LIST OF REFERENCE NUMERALS 1 solid plate
2 perforated air diffusion foil
3', 3" profiled edge strip
4', 4" profiled edge strip
5 securing means (screw)
6 bracket
7 cross strip
8 sealing disk
a air supply connection
10 ballast inlay (strip)

DETAILED DESCRIPTION OF THE INVENTION

Figure 2:
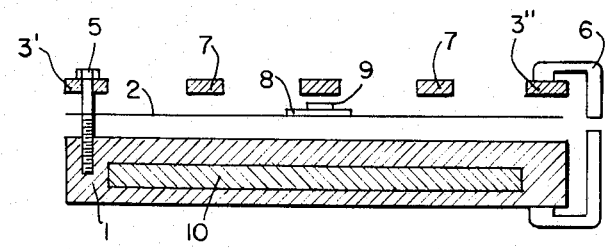
FIG. 2, is a cross sectional view of an air diffusion device according to FIG. 1, showing the parts in an exploded view.

An air diffusion device in accordance with the present invention shown in FIG. 1 comprises a solid plate 1 made of plastic, Eternit or the like. A perforated air diffusion foil 2 is mounted on solid plate 1. Edge strips 3', 3"; 4', 4" are provided for tightly joining the perforated air diffusion foil to the solid plate 1. To join the edge strips 3', 3"; 4', 4" to the solid plate 1, screws 5 which are screwed as shown on the left in FIG. 2, directly through the edge strips 3', 3", 4', 4", and the air diffusion foil 2 into the solid plate 1 at suitable points.

In order to prevent arching of the perforated air diffusion foil 2 when air or oxygen is supplied, cross strips 7 are provided. The cross strips 7 are also of plastic and are fixed in the longitudinal direction of the air diffusion device in such a manner that they do not reach the transversely extending strips 4', 4"; thus, although longitudinal chambers are formed when the cross strips 7 are screwed firmly to the solid plate 1, still these chambers communicate with one another at the transverse ends.

To increase the specific weight of the air diffusion device, ballast inlays in the form of crosswise extending strips, for instance of iron or steel, are provided in the solid plate 1. These ballast inlays 10 may be molded in place at the same time as the solid plate 1 is being made. For supplying air or oxygen, the perforated air diffusion foil 2 is provided, preferably near one long end thereof, with an air supply connection 9, which discharges at a sealing disk 8.

As a result of the embodiment according to the invention, it is attained that the air bubbles emerging from the air diffusion device have the same diameter and a uniform distribution over the entire surface of the diffusion device.

The invention is not restricted to the preferred embodiment shown and described. For instance, the cross strips can also extend transversely to the longitudinal direction and/or the ballast inlays can be disposed extending in the longitudinal direction. The brackets used in one exemplary embodiment for securing the perforated air diffusion foil 2 to the solid plate 1 can additionally be screwed or riveted to the solid plate 1.

The invention accordingly encompasses all modifications, simplifications and further developments within the competence of one skilled in the art, as well as partial and/or subcombinations of the characteristics and provisions described.

I claim:

1. An air diffusion device, comprising:
   a solid plate including an upper major surface having a perimeter with a predetermined width and a predetermined length;
   a perforated air diffusion foil sheet having a length and a width at least as great as said predetermined length and said predetermined width, respectively, of said plate,
   said foil sheet overlying said major surface;
   first securing means for securing said foil sheet, at the perimeter of said major surface of said plate, to said plate in an airtight manner such that a chamber is formed between said foil sheet and said plate major surface;
   second securing means, disposed within the perimeter of said plate major surface and atop the foil sheet, for securing said foil sheet directly therebeneath to said plate,
   said second securing means being spaced from said first securing means to permit communication between all points of said chamber; and
   air supply means for supplying air to said chamber,
   whereby air supplied to said chamber at a single location communicates with the entire chamber.

2. The air diffusion device of claim 1, wherein
   said first securing means includes a surface disposed atop said foil sheet and comprises first clamping means extending along said predetermined length of said plate perimeter and second clamping means extending along said predetermined width of said plate perimeter.

3. The air diffusion device of claim 2, wherein
   said first and second clamping means each comprise elongated strips having one surface disposed atop and pressing said foil sheet into sealing engagement with a corresponding portion of said plate major surface.

4. The air diffusion device of claim 3, wherein said first and second clamping means further comprise self-tapping screws for securely attaching said strips and said foil sheet to said plate major surface.

5. The air diffusion device of claim 3, wherein said second securing means comprises elongated strips having first and second end portions spaced from at least said second clamping means.

6. The air diffusion device of claim 5, wherein said first and second securing means further comprise self-tapping screws for securely attaching said strips and said foil sheet to said plate major surface.

7. The air diffusion device of claim 5, wherein said first and second securing means further comprise rivets for joining said foil sheet to said plate major surface.

8. The air diffusion device of claim 1, wherein said solid plate includes at least one ballast inlay for increasing the weight of said plate.

9. The air diffusion device of claim 8, wherein said at least one ballast inlay comprises iron rod means.

10. The air diffusion device of claim 1, wherein said foil sheet includes an apertured sealing disk at a single location spaced from said first and second securing means, and said air supply means is connected for communication with said chamber through said said sealing disk at said single location.

11. An air diffusion device, adapted for placement at the bottom of a water reservoir, for producing an even distribution of small bubbles to aerate the water in the reservoir, comprising:
    a solid plate including an upper major surface having a predetermined width and a predetermined length;
    an air diffusion sheet having a length and a width at least as great as said predetermined length and said predetermined width, respectively, of said plate,
    said air diffusion sheet overlying said major surface and including arrays of perforations therethrough;
    first strip means, disposed along the predetermined width and the predetermined length of said plate major surface and atop said air diffusion sheet, for securing said air diffusion sheet to the major surface of said plate in an airtight manner such that a space is formed between said air diffusion sheet and said plate major surface;
    second strip means, disposed atop said air diffusion sheet and having end portions spaced from said first strip means, for securing said air diffusion sheet directly therebeneath to said plate means major surface,
    said second strip means dividing said space into a plurality of subspaces, with all of said subspaces communicating with one another, and with all of said subspaces being covered by a portion of said air diffusion sheet having said perforations therethrough; and
    means for supplying air to said at least one of said subspaces,
    whereby when air is supplied to said at least one subspace, said portions of said air diffusion sheet covering each of said subspaces permit said air to emerge from each said subspace as air bubbles having substantially the same diameter and having a substantially uniform distribution over the entire surface of said air diffusion device.

* * * * *